U S 0 1 2 0 2 8 8 3 9 B 2

US012028839B2

(12) United States Patent
Huang et al.

(10) Patent No.: US 12,028,839 B2
(45) Date of Patent: Jul. 2, 2024

(54) ASSIGNING TIME DOMAIN RESOURCES TO FRAGMENTED ORTHOGONAL FREQUENCY DIVISION MULTIPLEXING (OFDM) SYMBOLS

(71) Applicant: QUALCOMM Incorporated, San Diego, CA (US)

(72) Inventors: Yi Huang, San Diego, CA (US); Juan Montojo, San Diego, CA (US); Wanshi Chen, San Diego, CA (US); Peter Gaal, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 17/471,346

(22) Filed: Sep. 10, 2021

(65) Prior Publication Data
US 2022/0078777 A1   Mar. 10, 2022

Related U.S. Application Data

(60) Provisional application No. 63/076,879, filed on Sep. 10, 2020.

(51) Int. Cl.
| | |
|---|---|
| *H04W 72/044* | (2023.01) |
| *H04J 1/02* | (2006.01) |
| *H04L 5/00* | (2006.01) |

(52) U.S. Cl.
CPC ............ *H04W 72/044* (2013.01); *H04J 1/02* (2013.01); *H04L 5/0007* (2013.01); *H04L 5/0044* (2013.01); *H04L 5/0048* (2013.01)

(58) Field of Classification Search
CPC ....... H04W 72/044; H04J 1/02; H04L 5/0007; H04L 5/0044; H04L 5/0048; H04L 5/0051; H04L 27/2608; H04L 5/0046
See application file for complete search history.

(56) References Cited

U.S. PATENT DOCUMENTS

| | | | |
|---|---|---|---|
| 2017/0149536 A1 * | 5/2017 | Chu ...................... | H04L 5/0007 |
| 2018/0199367 A1 * | 7/2018 | Jung .................... | H04L 5/0091 |

(Continued)

FOREIGN PATENT DOCUMENTS

| | | | |
|---|---|---|---|
| WO | 2020165998 A1 | 8/2020 | |
| WO | WO-2021166440 A1 * | 8/2021 | ............... H04L 1/08 |

OTHER PUBLICATIONS

International Search Report and Written Opinion—PCT/US2021/049823—ISA/EPO—Dec. 20, 2021.

*Primary Examiner* — Ian N Moore
*Assistant Examiner* — Latresa A McCallum
(74) *Attorney, Agent, or Firm* — Kevin M. Donnelly; Seyfarth Shaw LLP

(57) ABSTRACT

A method of wireless communication by a user equipment (UE) includes receiving, from a base station, signaling indicating an assignment of resources in a physical time domain to a set of contiguous symbols in a virtual domain. Each symbol of the set of contiguous symbols may be associated with a respective orthogonal frequency-division multiplexed (OFDM) symbol of a respective one of multiple sets of one or more contiguous OFDM symbols in the physical time domain. Each set of OFDM symbols may be associated with a slot in the physical time domain. The method also includes mapping the physical time domain resources to the multiple sets of OFDM symbols based on the assignment of the physical time domain resources to the set of contiguous symbols. The method further includes receiving or transmitting the multiple sets of OFDM symbols on the physical time domain resources based on the mapping.

26 Claims, 11 Drawing Sheets

(56) References Cited

U.S. PATENT DOCUMENTS

| | | | |
|---|---|---|---|
| 2019/0052420 A1* | 2/2019 | Manolakos | H04L 5/0051 |
| 2019/0288816 A1* | 9/2019 | Ren | H04L 5/0094 |
| 2022/0021434 A1* | 1/2022 | Huang | H04W 72/1268 |
| 2022/0086823 A1* | 3/2022 | Huang | H04W 72/0446 |
| 2022/0150003 A1 | 5/2022 | Takeda et al. | |
| 2023/0091216 A1* | 3/2023 | Yamamoto | H04L 1/08 |
| | | | 370/329 |

* cited by examiner

ASSIGNING TIME DOMAIN RESOURCES TO FRAGMENTED ORTHOGONAL FREQUENCY DIVISION MULTIPLEXING (OFDM) SYMBOLS

CROSS-REFERENCE TO RELATED APPLICATION

The present application claims the benefit of U.S. Provisional Patent Application No. 63/076,879, filed on Sep. 10, 2020, and titled "ASSIGNING TIME DOMAIN UPLINK RESOURCES TO FRAGMENTED UPLINK ORTHOGONAL FREQUENCY DIVISION MULTIPLEXING (OFDM) SYMBOLS," the disclosure of which is expressly incorporated by reference in its entirety.

FIELD OF THE DISCLOSURE

Aspects of the present disclosure generally relate to wireless communications, and more particularly to assigning time domain resources to fragmented orthogonal frequency division multiplexing (OFDM) symbols for transmissions on a physical channel.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (for example, bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, or the like.

The above multiple access technologies have been adopted in various telecommunications standards to provide a common protocol that enables different user equipment to communicate on a municipal, national, regional, and even global level. NR, which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDM (for example, also known as discrete Fourier transform spread OFDM (DFT-S-OFDM)) on the uplink (UL), as well as supporting beamforming, multiple-input multiple-output (MIMO) antenna technology, and carrier aggregation.

In wireless communication systems, communication resources (for example, uplink communication resources or downlink communication resources) may be assigned to orthogonal frequency division multiplexed (OFDM) symbols within a time division duplex (TDD) uplink/downlink (UL/DL) pattern. In some examples, both a first set of OFDM symbols and a second set of OFDM symbols may be associated with either an uplink transmission or a downlink transmission. Each set of OFDM symbols may include one or more contiguous OFDM symbols. In some such examples, the first set of OFDM symbols and the second set of OFDM symbols may be separated by a slot border or one or more different OFDM symbols. In such examples, each of the first set of OFDM symbols and the second set of OFDM symbols may be examples of OFDM symbol fragments. In one example, a first set of uplink OFDM symbols and a second set of uplink OFDM symbols may be separated by one or more downlink OFDM symbols or one or more flexible OFDM symbols. Similarly, a first set of downlink OFDM symbols and a second set of downlink OFDM symbols may be separated by one or more uplink OFDM symbols or one or more flexible OFDM symbols.

SUMMARY

In one aspect of the present disclosure, a method for wireless communication by a user equipment (UE) is disclosed. The method includes receiving, from a base station, signaling indicating an assignment of resources in a physical time domain to a set of contiguous symbols in a virtual domain. Each symbol of the set of contiguous symbols in the virtual domain may be associated with a respective orthogonal frequency-division multiplexed (OFDM) symbol of a respective one of multiple sets of one or more contiguous OFDM symbols in the physical time domain. Each set of OFDM symbols may be associated with a respective slot of multiple slots in the physical time domain. The multiple sets of OFDM symbols may carry a single physical channel payload. The method further includes mapping the physical time domain resources to the number of sets of OFDM symbols based on the assignment of the physical time domain resources to the set of contiguous symbols in the virtual domain. The method still further includes receiving or transmitting the multiple sets of OFDM symbols on the physical time domain resources based on the mapping.

Another aspect of the present disclosure is directed to an apparatus for wireless communication at a UE. The apparatus includes means for receiving, from a base station, signaling indicating an assignment of resources in a physical time domain to a set of contiguous symbols in a virtual domain. Each symbol of the set of contiguous symbols in the virtual domain may be associated with a respective OFDM symbol of a respective one of multiple sets of one or more contiguous OFDM symbols in the physical time domain. Each set of OFDM symbols may be associated with a respective slot of multiple slots in the physical time domain. The multiple sets of OFDM symbols may carry a single physical channel payload. The apparatus further includes means for mapping the physical time domain resources to the number of sets of OFDM symbols based on the assignment of the physical time domain resources to the set of contiguous symbols in the virtual domain. The apparatus still further includes means for receiving or transmitting the multiple sets of OFDM symbols on the physical time domain resources based on the mapping.

In another aspect of the present disclosure, a non-transitory computer-readable medium with non-transitory program code recorded thereon for wireless communication at a UE is disclosed. The program code is executed by a processor and includes program code to receive, from a base station, signaling indicating an assignment of resources in a physical time domain to a set of contiguous symbols in a virtual domain. Each symbol of the set of contiguous symbols in the virtual domain may be associated with a respective OFDM symbol of a respective one of multiple sets of one or more contiguous OFDM symbols in the physical time domain. Each set of OFDM symbols may be associated with a respective slot of multiple slots in the physical time domain. The multiple sets of OFDM symbols may carry a single physical channel payload. The program code further includes program code to map the physical time domain resources to the number of sets of OFDM symbols based on the assignment of the physical time domain resources to the set of contiguous symbols in the virtual domain. The program code still further includes program code to receive or transmit the multiple sets of OFDM symbols on the physical time domain resources based on the mapping.

Another aspect of the present disclosure is directed to an apparatus for wireless communication at a UE. The apparatus includes a processor, a memory coupled with the processor, and instructions stored in the memory and operable, when executed by the processor, to cause the apparatus to receive, from a base station, signaling indicating an assignment of resources in a physical time domain to a set of contiguous symbols in a virtual domain. Each symbol of the set of contiguous symbols in the virtual domain may be associated with a respective OFDM symbol of a respective one of multiple sets of one or more contiguous OFDM symbols in the physical time domain. Each set of OFDM symbols may be associated with a respective slot of multiple slots in the physical time domain. The multiple sets of OFDM symbols may carry a single physical channel payload. Execution of the instructions also cause the apparatus to map the physical time domain resources to the number of sets of OFDM symbols based on the assignment of the physical time domain resources to the set of contiguous symbols in the virtual domain. Execution of the instructions further cause the apparatus to receive or transmit the multiple sets of OFDM symbols on the physical time domain resources based on the mapping.

In one aspect of the present disclosure, a method for wireless communication by a base station is disclosed. The method includes assigning physical time domain resources to a set of contiguous symbols in a virtual domain. The method further includes mapping the physical time domain resources, assigned to the set of contiguous symbols, to multiple sets of one or more contiguous OFDM symbols in the physical time domain. Each set of OFDM symbols may be associated with a respective slot of multiple slots in the physical time domain. The multiple sets of OFDM symbols may carry a single physical channel payload. The method still further includes transmitting, to a UE, signaling indicating the assignment of the physical time domain resources to the set of contiguous symbols in the virtual domain. Each symbol of the set of contiguous symbols may be associated with a respective OFDM symbol of a respective one of the multiple sets of one or more contiguous OFDM symbols. The method also includes receiving or transmitting the multiple sets of OFDM symbols on the physical time domain resources based on the mapping.

Another aspect of the present disclosure is directed to an apparatus for wireless communication at a base station. The apparatus includes means for assigning physical time domain resources to a set of contiguous symbols in a virtual domain. The apparatus further includes means for mapping the physical time domain resources, assigned to the set of contiguous symbols, to multiple sets of one or more contiguous OFDM symbols in the physical time domain. Each set of OFDM symbols may be associated with a respective slot of multiple slots in the physical time domain. The multiple sets of OFDM symbols may carry a single physical channel payload. The apparatus still further includes means for transmitting, to a UE, signaling indicating the assignment of the physical time domain resources to the set of contiguous symbols in the virtual domain. Each symbol of the set of contiguous symbols may be associated with a respective OFDM symbol of a respective one of the multiple sets of one or more contiguous OFDM symbols. The apparatus also includes means for receiving or transmitting the multiple sets of OFDM symbols on the physical time domain resources based on the mapping.

In another aspect of the present disclosure, a non-transitory computer-readable medium with non-transitory program code recorded thereon for wireless communication at a base station is disclosed. The program code is executed by a processor and includes program code to assign physical time domain resources to a set of contiguous symbols in a virtual domain. The program code further includes program code to map the physical time domain resources, assigned to the set of contiguous symbols, to multiple sets of one or more contiguous OFDM symbols in the physical time domain. Each set of OFDM symbols may be associated with a respective slot of multiple slots in the physical time domain. The multiple sets of OFDM symbols may carry a single physical channel payload. The program code still further includes program code to transmit, to a UE, signaling indicating the assignment of the physical time domain resources to the set of contiguous symbols in the virtual domain. Each symbol of the set of contiguous symbols may be associated with a respective OFDM symbol of a respective one of the multiple sets of one or more contiguous OFDM symbols. The program code also includes program code to receive or transmit the multiple sets of OFDM symbols on the physical time domain resources based on the mapping.

Another aspect of the present disclosure is directed to an apparatus for wireless communication at a base station. The apparatus includes a processor, a memory coupled with the processor, and instructions stored in the memory and operable, when executed by the processor, to cause the apparatus to assign physical time domain resources to a set of contiguous symbols in a virtual domain. Execution of the instructions also cause the apparatus to map the physical time domain resources, assigned to the set of contiguous symbols, to multiple sets of one or more contiguous OFDM symbols in the physical time domain. Each set of OFDM symbols may be associated with a respective slot of multiple slots in the physical time domain. The multiple sets of OFDM symbols may carry a single physical channel payload. Execution of the instructions further cause the apparatus to transmit, to a UE, signaling indicating the assignment of the physical time domain resources to the set of contiguous symbols in the virtual domain. Each symbol of the set of contiguous symbols may be associated with a respective OFDM symbol of a respective one of the multiple sets of one or more contiguous OFDM symbols. Execution of the instructions still further cause the apparatus to receive or transmit the multiple sets of OFDM symbols on the physical time domain resources based on the mapping.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description, may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
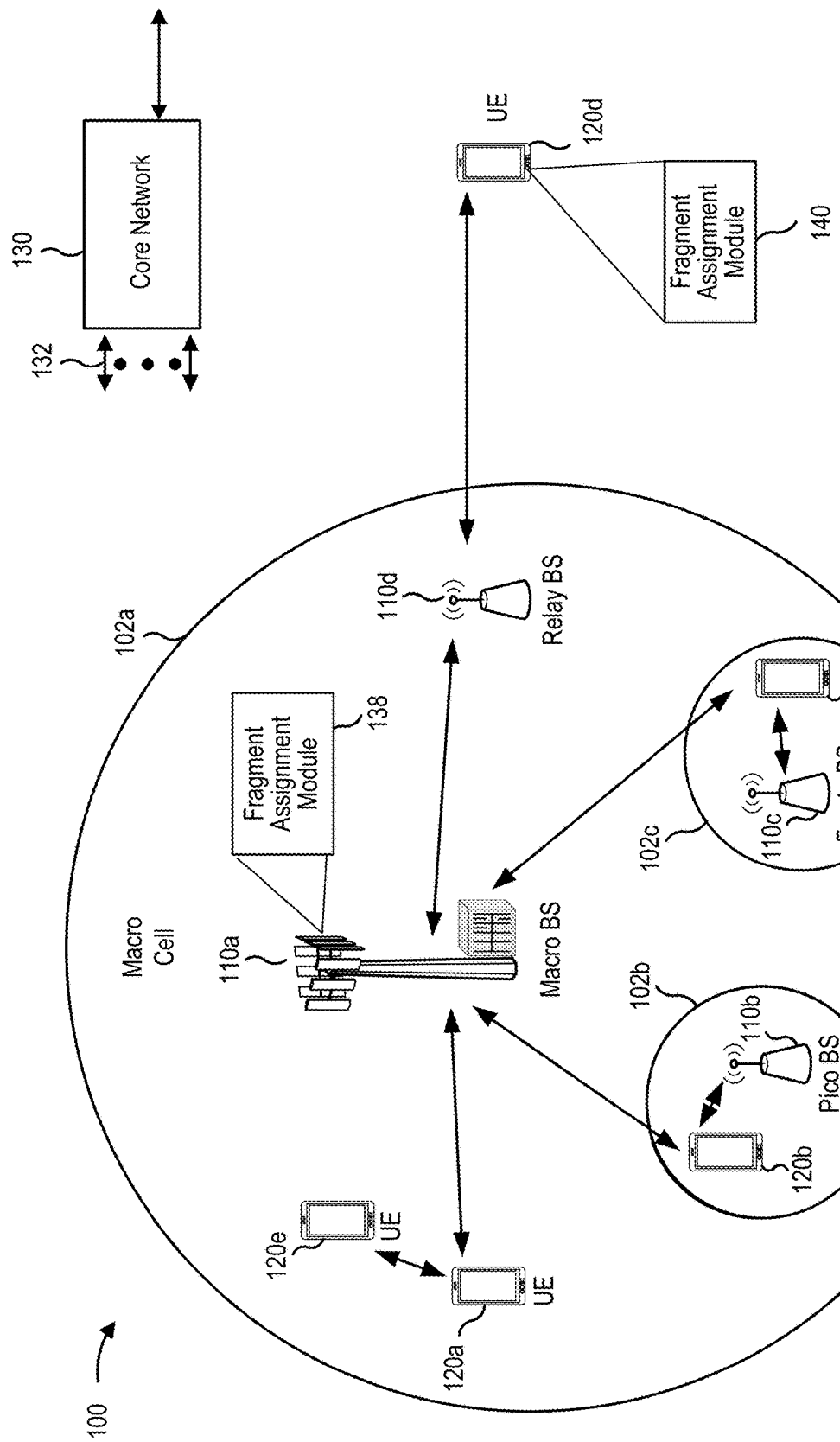
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G or 4G technologies.

As discussed, in some wireless communication systems, communication resources (for example, uplink communication resources or downlink communication resources) may be assigned to orthogonal frequency division multiplexed (OFDM) symbols within a time division duplex (TDD) uplink/downlink (UL/DL) pattern. In some examples, both a first set of OFDM symbols and a second set of OFDM symbols may be associated with either an uplink transmission or a downlink transmission. In some such examples, the first set of OFDM symbols and the second set of OFDM symbols may be separated by a slot boundary or one or more OFDM symbols of a different type based on the UL/DL pattern. In such examples, each of the first set of OFDM symbols and the second set of OFDM symbols may be referred to as an OFDM symbol fragment or fragmented resource.

In such wireless communication systems, existing demodulation reference signal (DMRS) patterns do not operate well with fragmented resources due to the unequal lengths of each fragment and limitations specific to discrete Fourier transform spread OFDM (DFT-S-OFDM) waveforms. For example, a single OFDM symbol may not be used for the DFT-S waveform. Additionally, each fragmented resource may be associated with downlink signaling. Therefore, transmitting multiple fragmented resources may increase signaling overhead. Thus, it may be desirable to merge the fragmented resources to create a larger set of communication resources. Still, due to one or more limitations, conventional wireless communication systems may not merge fragmented resources to create a larger set of resources. In some such examples, a base station (for example, a gNB) may not merge the fragmented resources (for example, OFDM symbol fragments) to create a larger set of resources when two sets of OFDM symbols are separated by a slot boundary. In such examples, the base station may not merge the OFDM symbol fragments to carry a physical channel payload, such as a physical uplink shared channel (PUSCH) or a physical uplink control channel (PUCCH) payload, because OFDM symbol allocation may not cross slot boundaries. Rather, only OFDM symbols within one slot may carry the physical channel payload.

According to aspects of the present disclosure, a UE and a base station may each identify and merge multiple OFDM symbol fragments from a configured TDD pattern into a larger set of OFDM symbols in a virtual domain. In some examples, each OFDM symbol fragment includes one OFDM symbol or two or more contiguous OFDM symbols associated with the configured TDD pattern. In some such examples, the OFDM symbols associated with each OFDM symbol fragment may be uplink symbols. In some other examples, the OFDM symbols associated with each OFDM symbol fragment may be downlink symbols. In some aspects, the base station or the UE may concatenate multiple OFDM symbol fragments together in a contiguous fashion in the virtual domain based on an assignment of physical channel time domain resources to contiguous symbols in the virtual domain. For example, the base station may assign physical channel time domain resources to the virtual domain. The base station may then signal the physical channel time domain resource assignments to the UE. The UE and the base station may map each symbol of the contiguous symbols in the virtual domain to a respective OFDM symbol of a respective OFDM symbol fragment of the multiple OFDM symbol fragments. Finally, the UE and the base station may, respectively, transmit or receive the OFDM symbol fragments on the physical channel time domain resources based on the mapping.

According to further aspects of the present disclosure, a new DMRS pattern is introduced on every physical OFDM symbol. Moreover, the same DMRS pattern repeats across all physical OFDM symbols. For an OFDM waveform, the UE may frequency division multiplex the DMRS with data or control information, such as uplink control information (UCI). For a DFT-S-OFDM waveform, the UE may time division multiplex the DMRS with the data or the control information. In such latter examples, the time division multiplexing may occur prior to a transform precoding operation, such as DFT processing.

Particular aspects of the subject matter described in this disclosure may be implemented to realize one or more of the following potential advantages. In some aspects, generating a larger set of communication resources based on the mapping of each symbol of the contiguous symbols in the virtual domain to a respective OFDM symbol of a respective OFDM symbol fragment of the multiple OFDM symbol fragments may reduce network overhead by reducing an amount of downlink signaling required for receiving or transmitting the OFDM symbol fragments. The amount of downlink signaling may be reduced because the larger set of communication resources may be associated with a single downlink signal. In addition, using a new DMRS pattern on every physical OFDM symbol improves the operation of DMRS by accommodating single OFDM symbols in a DFT-S-OFDM waveform.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B (NB), an access point, a transmit and receive point (TRP), or the like. Each BS may provide communications coverage for a particular geographic area. In 3GPP, the term "cell" can refer to a coverage area of a BS or a BS subsystem serving this coverage area, depending on the context in which the term is used.

A BS may provide communications coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another or to one or more other BSs or network nodes (not shown) in the wireless network 100 through various types of backhaul interfaces such as a direct physical connection, a virtual network, or the like using any suitable transport network.

The wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110*d* may communicate with macro BS 110*a* and a UE 120*d* in order to facilitate communications between the BS 110*a* and UE 120*d*. A relay station may also be referred to as a relay BS, a relay base station, a relay, or the like.

The wireless network 100 may be a heterogeneous network that includes BSs of different types, for example, macro BSs, pico BSs, femto BSs, relay BSs, or the like. These different types of BSs may have different transmit power levels, different coverage areas, and different impact on interference in the wireless network 100. For example, macro BSs may have a high transmit power level (for example, 5 to 40 Watts) whereas pico BSs, femto BSs, and relay BSs may have lower transmit power levels (for example, 0.1 to 2 Watts).

As an example, the BSs 110 (shown as BS 110*a*, BS 110*b*, BS 110*c*, and BS 110*d*) and the core network 130 may exchange communications via backhaul links 132 (for example, S1, etc.). Base stations 110 may communicate with one another over other backhaul links (for example, X2, etc.) either directly or indirectly (for example, through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (for example, S1, S2, etc.) and may perform radio configuration and scheduling for communications with the UEs 120. In some configurations, various functions of each access network entity or base station 110 may be distributed across various network devices (for example, radio heads and access network controllers) or consolidated into a single network device (for example, a base station 110).

UEs 120 (for example, 120*a*, 120*b*, 120*c*) may be dispersed throughout the wireless network 100, and each UE may be stationary or mobile. A UE may also be referred to as an access terminal, a terminal, a mobile station, a subscriber unit, a station, or the like. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a fragment assignment module 140. For brevity, only one UE 120*d* is shown as including the fragment assignment module 140. The fragment assignment module 140 may receive, from a base station 110, signaling indicating an assignment of resources in a physical time domain to a set of contiguous symbols in a virtual domain. Each symbol of the set of contiguous symbols in the virtual domain may be associated with a respective OFDM symbol of a respective one of multiple sets of one or more contiguous OFDM symbols in the physical time domain. Additionally, each set of OFDM symbols may be associated with a respective slot of multiple slots in the physical time domain. Furthermore, the multiple sets of OFDM symbols may carry a single physical channel payload. The fragment assignment module 140 may also map the physical time domain resources to the number of sets of OFDM symbols based on the assignment of the physical time domain resources to the set of contiguous symbols in the virtual domain. The fragment assignment module 140 may further receive or transmit the multiple sets of OFDM symbols on the physical time domain resources based on the mapping.

The base stations 110 may include a fragment assignment module 138. The fragment assignment module 138 may assign physical time domain resources to a set of contiguous symbols in a virtual domain. The fragment assignment module 138 may also map the physical time domain resources, assigned to the set of contiguous symbols, to multiple sets of one or more contiguous OFDM symbols in the physical time domain. Each set of OFDM symbols may be associated with a respective slot of multiple slots in the physical time domain. The multiple sets of OFDM symbols may carry a single physical channel payload. The fragment assignment module 138 may further transmit, to a UE 120, signaling indicating the assignment of the physical time domain resources to the set of contiguous symbols in the virtual domain. Each symbol of the set of contiguous symbols may be associated with a respective OFDM symbol of a respective one of the multiple sets of one or more contiguous OFDM symbols. The fragment assignment module 138 may further receive or transmit the multiple sets of OFDM symbols on the physical time domain resources based on the mapping.

Some UEs may be considered machine-type communications (MTC) or evolved or enhanced machine-type communications (eMTC) UEs. MTC and eMTC UEs include, for example, robots, drones, remote devices, sensors, meters, monitors, location tags, or the like, that may communicate with a base station, another device (for example, remote device), or some other entity. A wireless node may provide, for example, connectivity for or to a network (for example, a wide area network such as Internet or a cellular network) via a wired or wireless communications link. Some UEs may be considered Internet-of-Things (IoT) devices, or may be implemented as NB-IoT (narrowband internet of things) devices. Some UEs may be considered a customer premises equipment (CPE). UE 120 may be included inside a housing that houses components of UE 120, such as processor components, memory components, or the like.

In general, any number of wireless networks may be deployed in a given geographic area. Each wireless network may support a particular radio access technology (RAT) and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or the like), a mesh network, or the like. In this case, the UE 120 may perform scheduling operations, resource selection operations, or other operations described elsewhere as being performed by the base station 110. For example, the base station 110 may configure a UE 120 via downlink control information (DCI), radio resource control (RRC) signaling, a media access control-control element (MAC-CE) or via system information (for example, a system information block (SIB).

Figure 2:
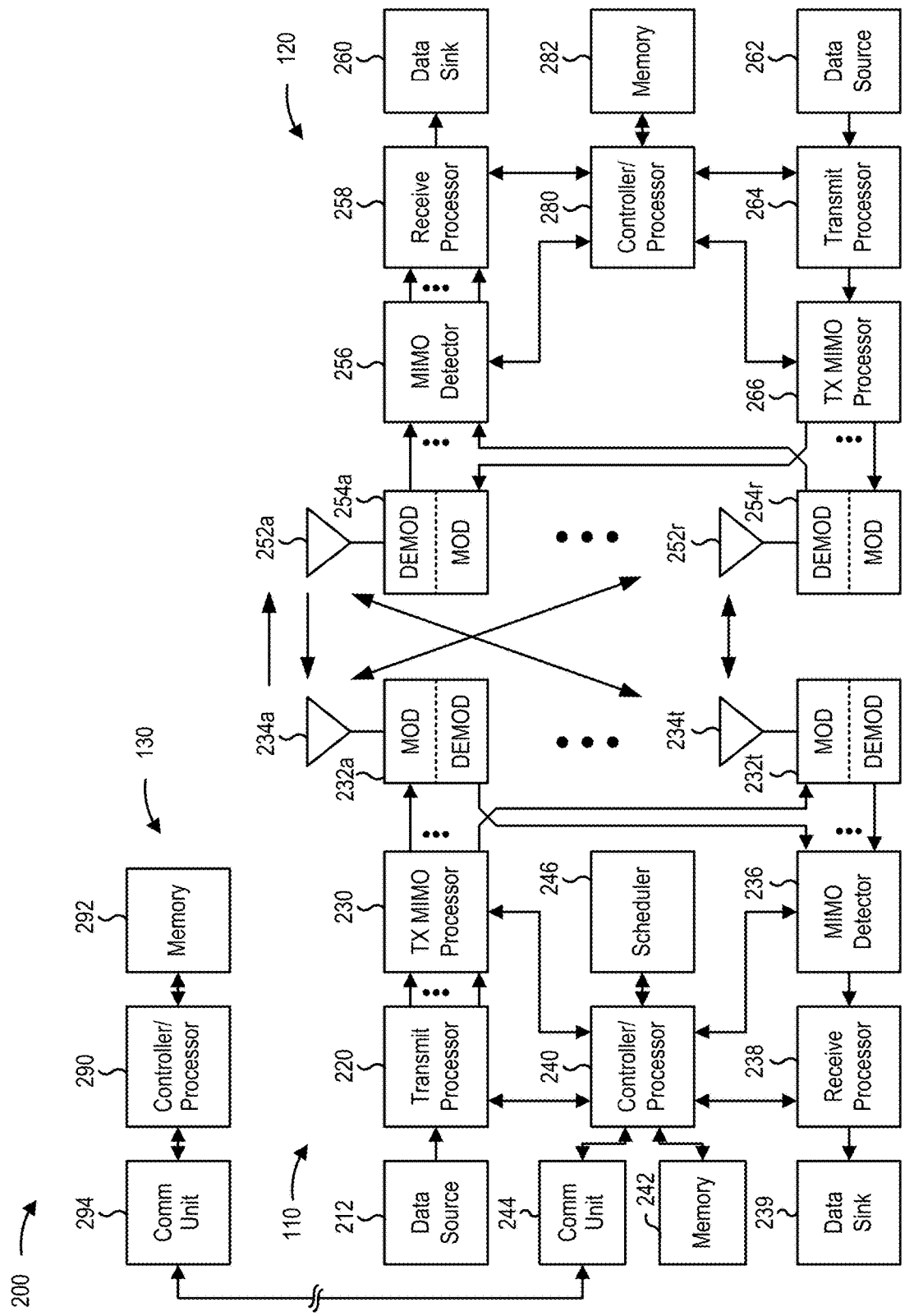
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. Decreasing the MCS lowers throughput but increases reliability of the transmission. The transmit processor 220 may also process system information (for example, for semi-static resource partitioning information (SRPI) or the like) and control information (for example, CQI requests, grants, upper layer signaling, or the like) and provide overhead symbols and control symbols. The transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each modulator 232 may process a respective output symbol stream (for example, for OFDM or the like) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM or the like) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), or the like. In some aspects, one or more components of the UE 120 may be included in a housing.

On the uplink, at the UE 120, a transmit processor 264 may receive and process data from a data source 262 and control information (for example, for reports comprising RSRP, RSSI, RSRQ, CQI, or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (for example, for DFT-s-OFDM, CP-OFDM, or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, or any other component(s) of FIG. 2 may perform one or more techniques associated with assignment of uplink resources as described in more detail elsewhere. For example, the controller/processor 240 of the base station 110, the controller/processor 280 of the UE 120, or any other component(s) of FIG. 2 may perform or direct operations of, for example, the processes of FIGS. 9 and 10 or other processes as described. Memories 242 and 282 may store data and program codes for the base station 110 and UE 120, respectively. A scheduler 246 may schedule UEs for data transmission on the downlink or uplink.

In wireless communication systems, communication resources may be segmented or fragmented in the time domain. In the present application, communication resources may be uplink communication resources, such as uplink OFDM symbols, or downlink communication resources, such as downlink OFDM symbols. As described, the communication resources may be necessitated based on a slot border or due to the presence of one or more OFDM symbols within a TDD UL/DL pattern.

Figure 3A:
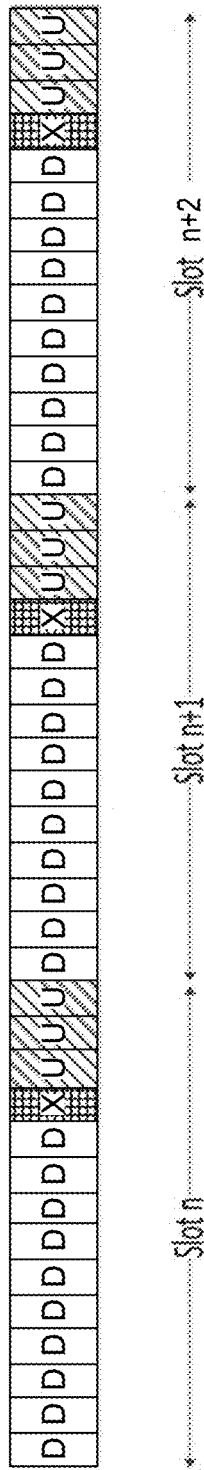
FIG. 3A is a diagram illustrating fragmentation due to an uplink/downlink pattern, in accordance with aspects of the present disclosure.

FIG. 3A is a diagram illustrating fragmentation due to an uplink/downlink pattern, in accordance with aspects of the present disclosure. FIG. 3A shows an uplink/downlink pattern across three slots (n, n+1, and n+2). For ease of explanation, the examples of FIG. 3A is directed to fragmented uplink OFDM symbols. Still, the example of FIG. 3A, as well as other aspects of the presented disclosure may also be directed to fragmented downlink OFDM symbols. In such examples, the fragmented downlink OFDM symbols may be concatenated into a set of contiguous downlink symbols in a virtual downlink domain, and time domain resources may be assigned to the set of contiguous downlink symbols in a virtual downlink domain.

In FIG. 3A, symbols indicated with 'D' represent downlink OFDM symbols, symbols indicated with 'U' represent uplink symbols, and symbols indicated with 'X' represent flexible symbols that may be dynamically configured and may provide a gap for switching between downlink and uplink OFDM symbols. The downlink OFDM symbols may be determined by either a semi-static uplink/downlink TDD pattern configuration or by a dynamic slot format indicator (SFI), which is an example of downlink control information (DCI) used to dynamically indicate flexible OFDM symbols as either downlink or uplink OFDM symbols. The semi-static uplink/downlink TDD pattern configuration can set some OFDM symbols as a flexible symbol and use dynamic SFI to change the flexible symbol to either an UL symbol or a DL symbol at a later time. As shown in FIG. 3A, no more than three uplink symbols may be contiguous in each slot. Thus, only three symbols may be available to carry a physical channel payload, such as a PUSCH or PUCCH payload.

Figure 3B:
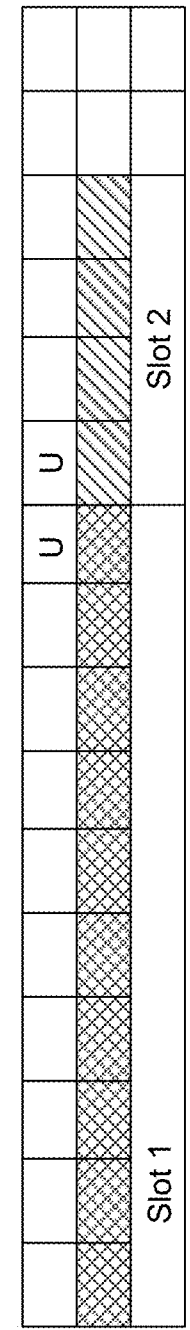
FIG. 3B is a diagram illustrating fragmentation due to crossing a slot boundary, in accordance with aspects of the present disclosure.

FIG. 3B is a diagram illustrating fragmentation due to crossing a slot boundary, in accordance with aspects of the present disclosure. For ease of explanation, the examples of FIG. 3B is directed to fragmented uplink OFDM symbols. Still, the example of FIG. 3B, as well as other aspects of the presented disclosure may be directed to fragmented downlink OFDM symbols. In the example of FIG. 3B, the slot boundary is static and may be determined based on both a frame structure and a slot structure. FIG. 3B shows two slots: slot one and slot two. Although the two uplink symbols are contiguous, one of the uplink symbols is in slot one, whereas the other uplink symbol is in slot two. Because communication resource allocation may not cross slot boundaries, the two uplink slots may be treated as if they are fragmented, such that each uplink slot may be a single uplink slot. Moreover, the base station (for example, gNB) may not merge the fragments to create a larger set of uplink resources. Consequently, the UE transmits two small transport blocks, instead of a single transport block across the two uplink slots. Each transport block may be associated with downlink control signaling. Thus, more signaling occurs with two smaller transport blocks than with a single larger transport block.

In some examples, a DMRS may be an example of a pilot signal, consisting of a Zadoff-Chu sequence in the frequency domain, transmitted between base stations and UEs, and also between two UEs to facilitate demodulation of data. The DMRS may be used by a wireless communication device to estimate a channel for demodulation of an associated physical channel. The DMRS may be device-specific, and thus, may directly correspond to data targeted to a particular UE. The DMRS may be transmitted on demand and may be configured with different patterns.

In the case of fragmented symbols, a dedicated DMRS pattern may be specified for each segment with different lengths (for example, number of symbols). In the traditional DMRS pattern design, for a given set of contiguous OFDM symbols for PUCCH or PUSCH, a subset of OFDM symbols are dedicated for the DMRS.

Figure 4A:
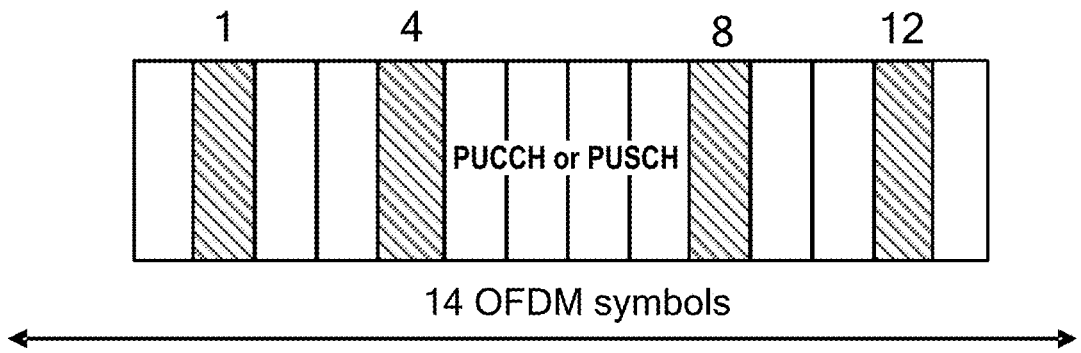
FIG. 4A is a block diagram illustrating demodulation reference signals multiplexed with physical channel resources, in accordance with aspects of the present disclosure.

FIG. 4A is a block diagram illustrating demodulation reference signals multiplexed with physical channel resources, in accordance with aspects of the present disclosure. For ease of explanation, the examples of FIG. 4A is directed to fragmented uplink communications. Still, the example of FIG. 4A, as well as other aspects of the presented disclosure may also be directed to downlink communications. In FIG. 4A, symbols 1, 4, 8, and 12 are assigned to DMRS, whereas the other ten OFDM symbols are allocated to physical channel, such as one or both of a PUCCH or a PUSCH. In this example, four DMRS symbols exist within a fourteen symbols, each DMRS symbol may be an example of a symbol fragment (for example, OFDM symbol fragment).

Figure 4B:
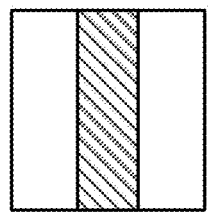
FIG. 4B is a block diagram illustrating demodulation reference signals multiplexed with physical channel resources, in accordance with aspects of the present disclosure.

FIG. 4B is a block diagram illustrating demodulation reference signals multiplexed with physical channel resources, in accordance with aspects of the present disclosure. For ease of explanation, the examples of FIG. 4B is directed to fragmented uplink communications. Still, the example of FIG. 4B, as well as other aspects of the presented disclosure may also be directed to downlink communications. In FIG. 4B, the middle symbol is assigned to DMRS, whereas the other two OFDM symbols are allocated to a physical channel, such as one or both of a PUCCH or a PUSCH. In this example, one DMRS symbol exists within three symbols, the one DMRS symbol may be an example of a symbol fragment.

Figure 4C:
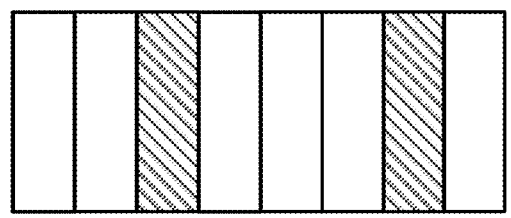
FIG. 4C is a block diagram illustrating demodulation reference signals multiplexed with physical channel resources, in accordance with aspects of the present disclosure.

FIG. 4C is a block diagram illustrating demodulation reference signals multiplexed with physical channel resources, in accordance with aspects of the present disclosure. For ease of explanation, the examples of FIG. 4C is directed to fragmented uplink communications. Still, the example of FIG. 4C, as well as other aspects of the presented disclosure may also be directed to downlink communications. In FIG. 4C, two symbols are assigned to DMRS, whereas the other OFDM symbols are allocated to a physical channel, such as one or both of a PUCCH or a PUSCH. In this example, two DMRS symbols exist within eight symbols, each DMRS symbol may be an example of a symbol fragment.

As seen in FIGS. 4A, 4B, and 4C, fragmentation or segmentation complicates traditional DMRS pattern designs, due to the unequal lengths of each fragment. FIG.

4A shows a fourteen symbol fragment, FIG. 4B shows a three symbol fragment, and FIG. 4C shows an eight symbol fragment, each fragment having a different number of DMRS symbols. A DMRS pattern design is desired to accommodate different physical channel durations, which may also accommodate different fragment sizes.

For a single OFDM symbol ("Orphan OS"), a traditional DMRS pattern design is incompatible with a DFT-S-OFDM waveform. That is, a single OFDM symbol may not be used for the DFT-S waveform. Accordingly, a DMRS pattern design may be desired to accommodate single OFDM symbols in a DFT-S-OFDM waveform.

According to aspects of the present disclosure, a UE and a base station may each merge fragmented OFDM symbols into a larger set of OFDM symbols in a virtual domain. In some aspects, each of the base station and the UE may concatenate the available symbols together in a contiguous fashion in the virtual domain. The base station may then perform time domain resource allocation (for example, physical channel time domain resource allocation) in the virtual domain. In some examples, the base station may ignore the slot boundaries, flexible symbols, and either downlink symbols or uplink symbols when allocating the resources. In such examples, the UE may map the symbols from the virtual domain to physical symbols based on the configured TDD pattern.

Figure 5:
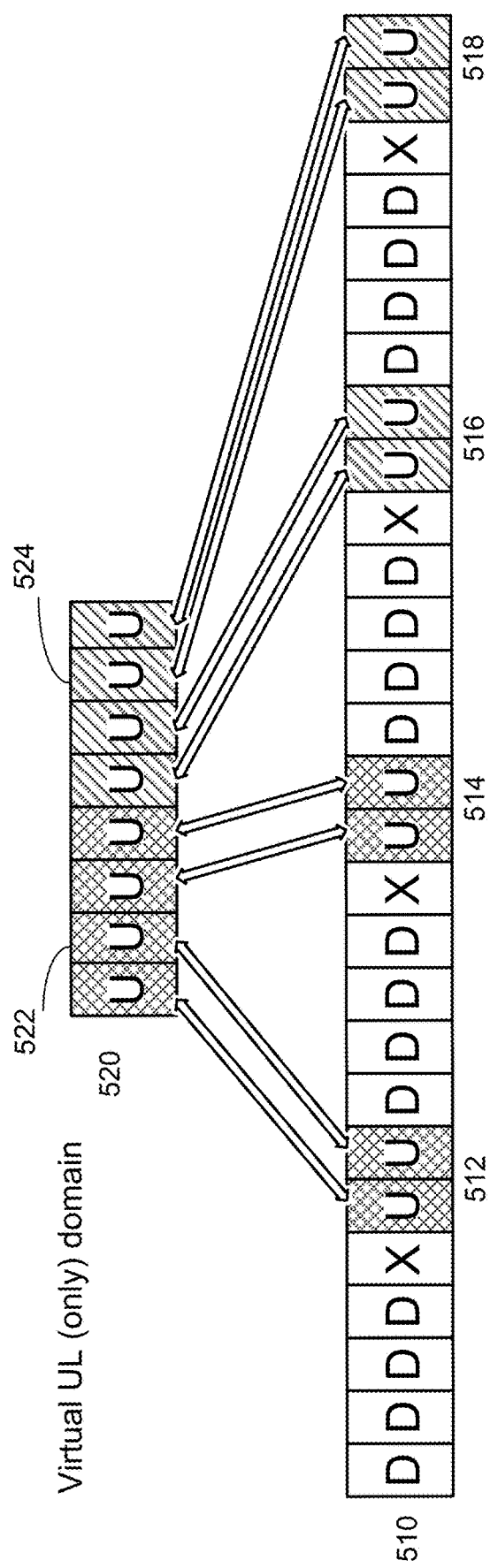
FIG. 5 is a block diagram illustrating a virtual domain for the assignment of resources, in accordance with aspects of the present disclosure.

FIG. 5 is a block diagram illustrating a virtual domain for assigning of uplink resources, in accordance with aspects of the present disclosure. For ease of explanation, the examples of FIG. 5 is directed to uplink communications. Still, the example of FIG. 5, as well as other aspects of the presented disclosure may also be directed to downlink communications. As seen in FIG. 5, the uplink symbols (U) in a physical domain 510 map to a virtual domain 520. The fragmented uplink symbols include subsets of UL symbols separated by downlink symbols. The fragments include first two uplink symbols 512, second two uplink symbols 514, third two uplink symbols 516, and fourth two uplink symbols 518. The fragments, 512, 514, 516, and 518 map from the physical domain 510 to the virtual domain 520. When mapping back to the physical domain, the first virtual symbol maps to the sixth physical symbol, the second virtual symbol maps to the seventh physical symbol, the third virtual symbol maps to the 13th physical symbol, and so on.

In the example of FIG. 5, the base station schedules two packets, a first packet 522 and a second packet 524. Based on the configured modulation and coding scheme (MCS) for this example, each packet may include four symbols. Thus, the first two symbols 512 and the second two symbols 514 map to the first packet 522. The third two symbols 516 and the fourth two symbols 518 map to the second packet 524.

According to aspects of the present disclosure, a new DMRS is introduced on every OFDM symbol. Moreover, the same DMRS pattern may repeat across all OFDM symbols. For an OFDM waveform, the UE frequency division multiplexes the reference signal, with data or control information, such as UCI. For a DFT-S-OFDM waveform, the UE time division multiplexes the DMRS with the data or the control information. The time division multiplexing occurs prior to a transform precoding operation, such as DFT processing.

Figure 6A:
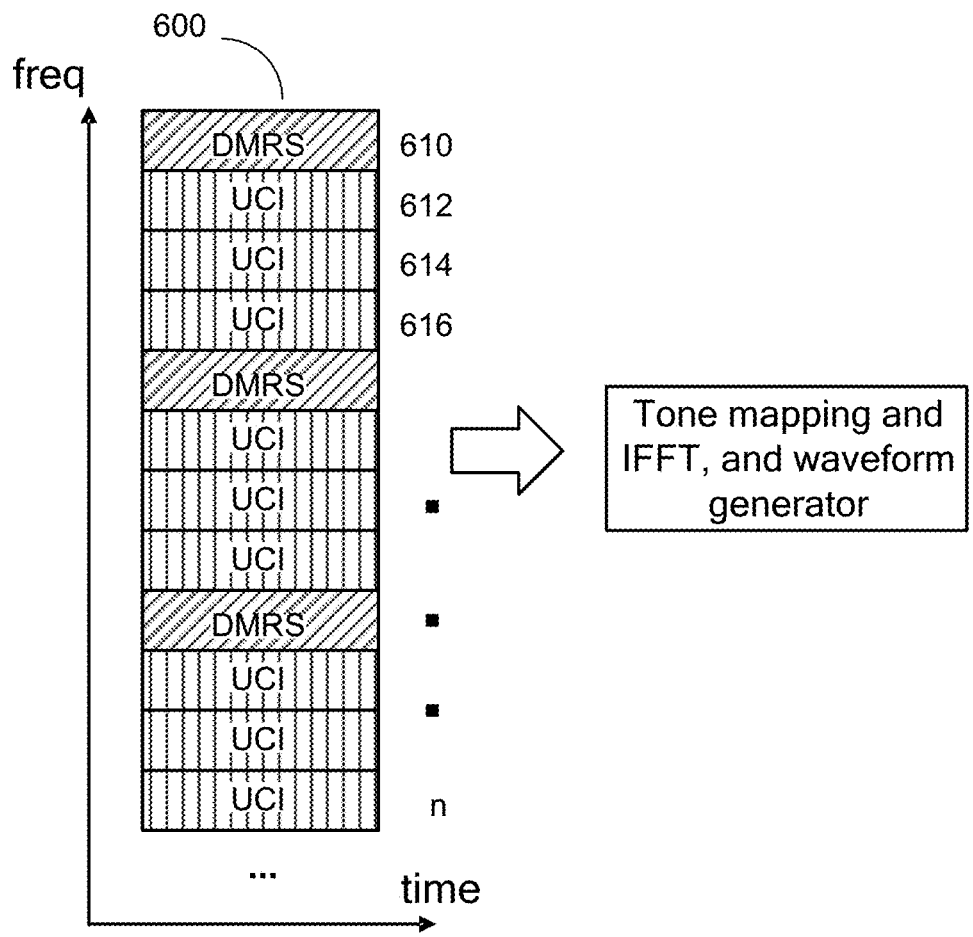
FIG. 6A is a block diagram illustrating frequency division multiplexing of demodulation reference signal (DMRS) symbols to generate an orthogonal frequency division multiplexed (OFDM) waveform, in accordance with aspects of the present disclosure.

FIG. 6A is a block diagram illustrating frequency division multiplexing of DMRS symbols to generate an OFDM waveform, in accordance with aspects of the present disclosure. For ease of explanation, the example of FIG. 6A is directed to uplink communications. Still, the example of FIG. 6A, as well as other aspects of the presented disclosure may also be directed to downlink communications. In FIG. 6A, a single OFDM symbol 600 includes multiple frequency tones 610, 612, 614, 616 . . . n. A first frequency tone 610 maps to DMRS, while the next three tones 612, 614, 616 map to UCI. The mapping pattern repeats within the symbol 600 and also on every other symbol within the virtual and physical uplink domains. Although UCI is shown, PUSCH or a combination of the two can multiplex with the DMRS. After, multiplexing, the UE generates the OFDM waveform by mapping the frequency division multiplexed information to the correct tone location and performing inverse fast Fourier transform (IFFT) processing.

Figure 6B:
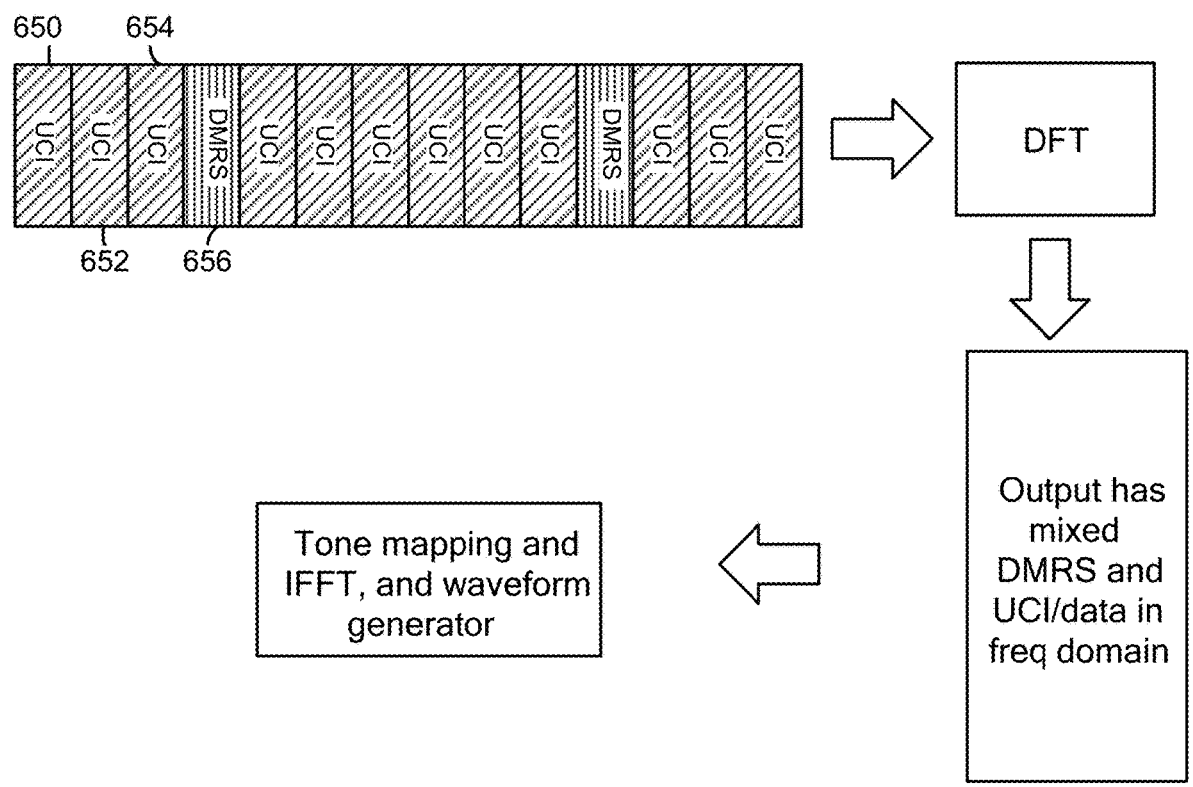
FIG. 6B is a block diagram illustrating time division multiplexing of DMRS symbols to generate a discrete Fourier transform spread orthogonal frequency division multiplexed (DFT-S-OFDM) waveform, in accordance with aspects of the present disclosure.

FIG. 6B is a block diagram illustrating time division multiplexing of DMRS symbols to generate a DFT-S-OFDM waveform, in accordance with aspects of the present disclosure. For ease of explanation, the example of FIG. 6B is directed to uplink communications. Still, the example of FIG. 6B, as well as other aspects of the presented disclosure may also be directed to downlink communications DFT-S-OFDM waveforms maintain a low peak to average power ratio (PAPR). If the UE inserts DMRS in the frequency domain when generating a DFT-S-OFDM waveform, the low PAPR disappears. Thus, In FIG. 6B, the UE time division multiplexes DMRS symbols with PUCCH or PUSCH symbols (UCI carried by PUCCH shown in FIG. 6B) to generate a DFT-S-OFDM waveform. The first three symbols 650, 652, 654 map to UCI, whereas the fourth symbol 656 maps to DMRS. After multiplexing in the time domain, the UE performs a transform precoding operation, such as DFT processing, to convert the information into the frequency domain. Once in the frequency domain, the UE generates the DFT-S-OFDM waveform by mapping the output of the DFT block to the correct tone location and performing IFFT processing.

Figure 7:
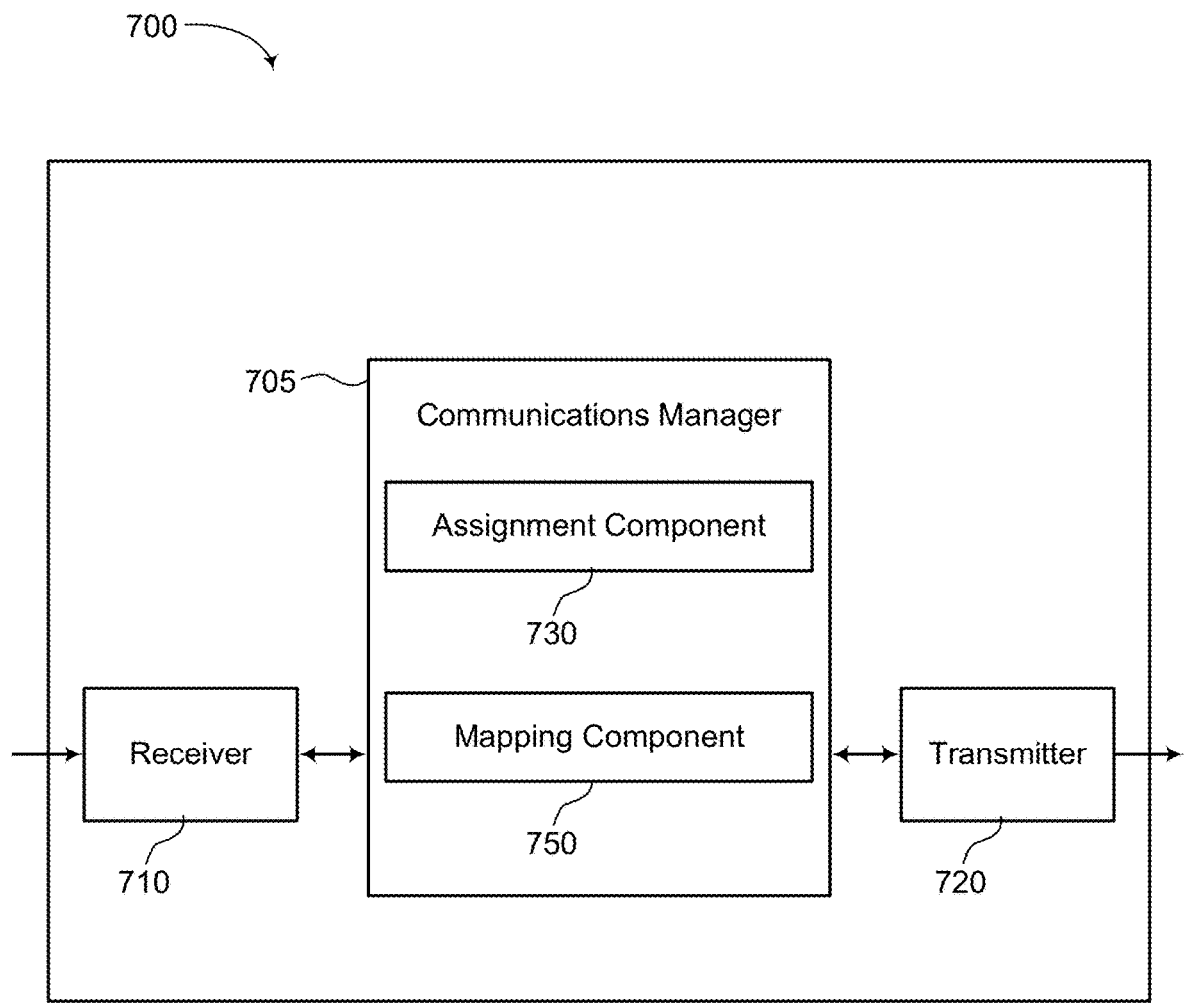
FIG. 7 is a block diagram illustrating an example of a wireless communication device that supports an assignment of communication resources to fragmented symbols, in accordance with various aspects of the present disclosure.

FIG. 7 is a block diagram illustrating an example of a wireless communication device 700 that supports assignment of communication resources to fragmented symbols, in accordance with various aspects of the present disclosure. The device 700 may be an example of aspects of a UE 120 described with reference to FIG. 1. The wireless communication device 700 may include a receiver 710, a communications manager 705, a transmitter 720, an assignment component 730, and a mapping component 750, which may be in communication with one another (for example, via one or more buses). In some examples, the wireless communication device 700 is configured to perform operations including operations of the process 900 described below with reference to FIG. 9.

In some examples, the wireless communication device 700 can include a chip, chipset, package, or device that includes at least one processor and at least one modem (for example, a 5G modem or other cellular modem). In some examples, the communications manager 705, or its sub-components, may be separate and distinct components. In some examples, at least some components of the communications manager 705 are implemented at least in part as software stored in a memory. For example, portions of one or more of the components of the communications manager 705 can be implemented as non-transitory code executable by the processor to perform the functions or operations of the respective component.

The receiver 710 may receive one or more of reference signals (for example, periodically configured CSI-RSs, aperiodically configured CSI-RSs, or multi-beam-specific reference signals), synchronization signals (for example, SSBs), control information and data information, such as in the form of packets, from one or more other wireless communication devices via various channels including control channels (for example, a physical downlink control channel (PDCCH)) and data channels (for example, a physical downlink shared channel (PDSCH)). The other wireless communication devices may include, but are not limited to, a base station 110 described with reference to FIG. 1.

The received information may be passed on to other components of the device 700. The receiver 710 may be an example of aspects of the receive processor 258 described with reference to FIG. 2. The receiver 710 may include a set of radio frequency (RF) chains that are coupled with or otherwise utilize a set of antennas (for example, the set of antennas may be an example of aspects of the antennas 252a through 252r described with reference to FIG. 2).

The transmitter 720 may transmit signals generated by the communications manager 705 or other components of the wireless communication device 700. In some examples, the transmitter 720 may be collocated with the receiver 710 in a transceiver. The transmitter 720 may be an example of aspects of the transmit processor 254 described with reference to FIG. 2. The transmitter 720 may be coupled with or otherwise utilize a set of antennas (for example, the set of antennas may be an example of aspects of the antennas 252a through 252r described with reference to FIG. 2), which may be antenna elements shared with the receiver 710. In some examples, the transmitter 720 is configured to transmit control information in a PUCCH and data in a PUSCH.

The communications manager 705 may be an example of aspects of the controller/processor 280 described with reference to FIG. 2. The communications manager 705 may include the assignment component 730 and the mapping component 750. In some examples, working in conjunction with the receiver 710, the assignment component 730 may assign physical time domain resources to a set of contiguous symbols in a virtual domain. Working in conjunction with the receiver 710 and the assignment component 730, the mapping component 750 maps the physical time domain resources, assigned to the set of contiguous symbols, to multiple sets of one or more contiguous OFDM symbols in the physical time domain. Each set of OFDM symbols may be associated with a respective slot of a plurality of slots in the physical time domain. Additionally, the multiple sets of OFDM symbols may carry a single physical channel payload. The transmitter 720 working in conjunction with one or more of the assignment component 730 and the mapping component 750 may transmit, to a UE, signaling indicating the assignment of the physical time domain resources to the set of contiguous symbols in the virtual domain. Each symbol of the set of contiguous symbols associated with a respective OFDM symbol of a respective one of the multiple sets of one or more contiguous OFDM symbols. The transmitter 720 or receiver 710, working in conjunction with one or more of the assignment component 730, and the mapping component 750, respectively transmit or receive the multiple sets of OFDM symbols on the physical time domain resources based on the mapping.

Figure 8:
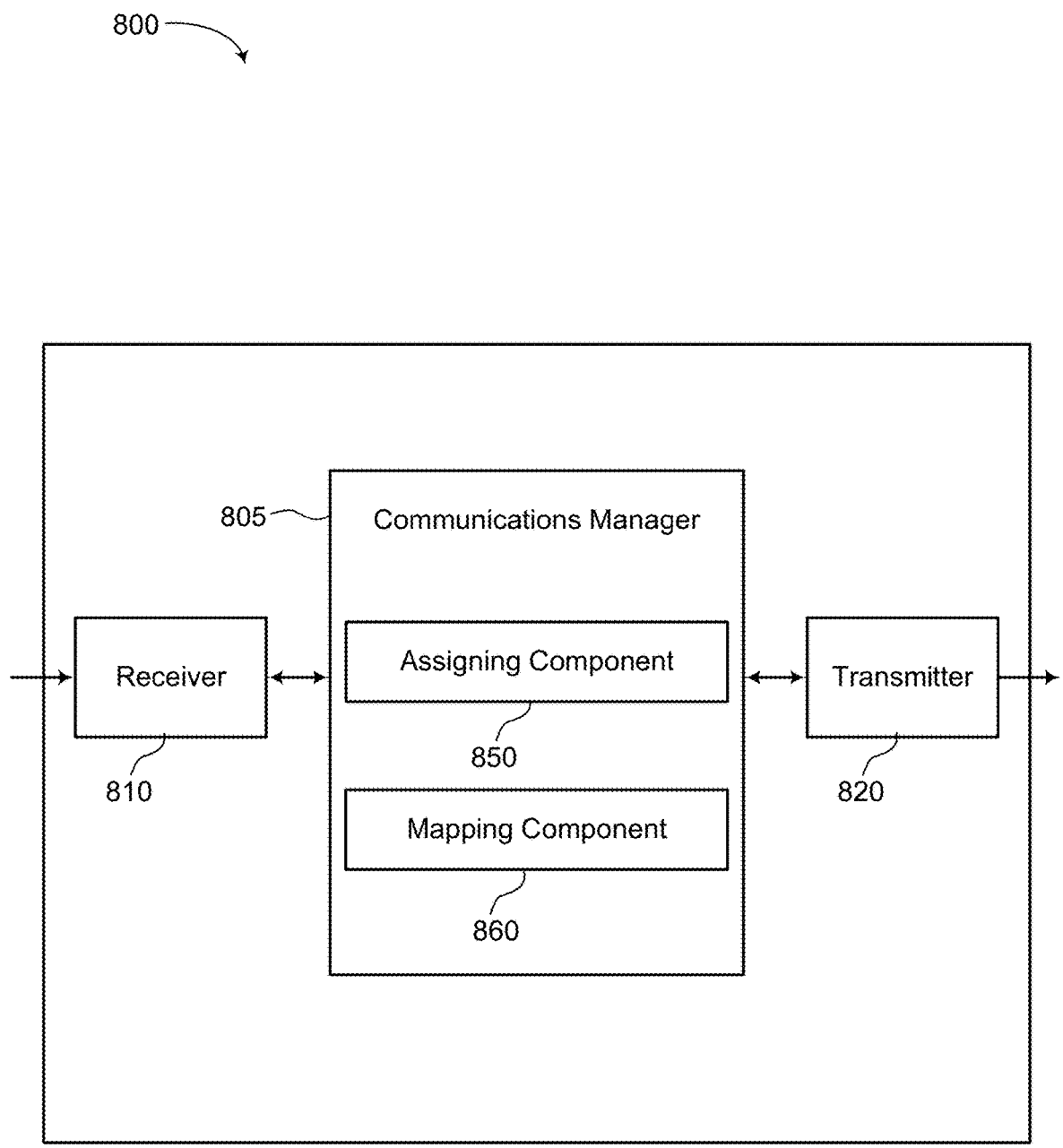
FIG. 8 is a block diagram illustrating an example of a wireless communication device that supports an assignment of communication resources to fragmented symbols, in accordance with various aspects of the present disclosure.

FIG. 8 is a block diagram illustrating an example of a wireless communication device 800 that supports assignment of resources to fragmented symbols, in accordance with various aspects of the present disclosure. The device 800 may be an example of aspects of a base station 110 described with reference to FIG. 1. The wireless communication device 800 may include a receiver 810, a communications manager 805, a transmitter 820, an assigning component 850, and a mapping component 860, which may be in communication with one another (for example, via one or more buses). In some examples, the wireless communication device 800 is configured to perform operations including operations of the process 1000 described below with reference to FIG. 10.

In some examples, the wireless communication device 800 can include a chip, chipset, package, or device that includes at least one processor and at least one modem (for example, a 5G modem or other cellular modem). In some examples, the communications manager 805, or its subcomponents, may be separate and distinct components. In some examples, at least some components of the communications manager 805 are implemented at least in part as software stored in a memory. For example, portions of one or more of the components of the communications manager 805 can be implemented as non-transitory code executable by the processor to perform the functions or operations of the respective component.

The receiver 810 may receive one or more of reference signals, control information and data information, such as in the form of packets, from one or more other wireless communication devices via various channels including control channels (for example, a PDCCH)) and data channels (for example, a (PDSCH)). The other wireless communication devices may include, but are not limited to, a UE 120 described with reference to FIG. 1.

The received information may be passed on to other components of the device 800. The receiver 810 may be an example of aspects of the receive processor 238 described with reference to FIG. 2. The receiver 810 may include a set of RF chains that are coupled with or otherwise utilize a set of antennas (for example, the set of antennas may be an example of aspects of the antennas 234a through 234r described with reference to FIG. 2).

The transmitter 820 may transmit signals generated by the communications manager 805 or other components of the wireless communication device 800. In some examples, the transmitter 820 may be collocated with the receiver 810 in a transceiver. The transmitter 820 may be an example of aspects of the transmit processor 220 described with reference to FIG. 2. The transmitter 820 may be coupled with or otherwise utilize a set of antennas (for example, the set of antennas may be an example of aspects of the antennas 234a through 234r described with reference to FIG. 2), which may be antenna elements shared with the receiver 810. In some examples, the transmitter 820 is configured to transmit control information in a PDCCH and data in a PDSCH.

The communications manager 805 may be an example of aspects of the controller/processor 240 described with reference to FIG. 2. The communications manager 805 may include the assigning component 850, and the mapping component 860. In one implementation, working in conjunction with the receiver 810, the assigning component 850, may receive, from a base station, signaling indicating an assignment of resources in a physical time domain to a set of contiguous symbols in a virtual domain. Each symbol of the set of contiguous symbols in the virtual domain may be associated with a respective OFDM symbol of a respective one of multiple sets of one or more contiguous OFDM symbols (for example, OFDM symbol fragments) in the physical time domain. Additionally, each set of OFDM symbols may be associated with a respective slot of multiple slots in the physical time domain. Furthermore, the multiple sets of OFDM symbols carrying a single physical channel payload. In this implementation, working in conjunction with one or more of the receiver 810 and the assigning component 850, the mapping component 860 may map the physical time domain resources to the multiple sets of OFDM symbols based on the assignment of the physical time domain resources to the set of contiguous symbols in the virtual domain. Working in conjunction with one or more of the assigning component 850 and the mapping component 860, the transmitter 820 or receiver 810 may, respectively, transmit or receive the multiple sets of OFDM symbols on the physical time domain resources based on the mapping.

Figure 9:
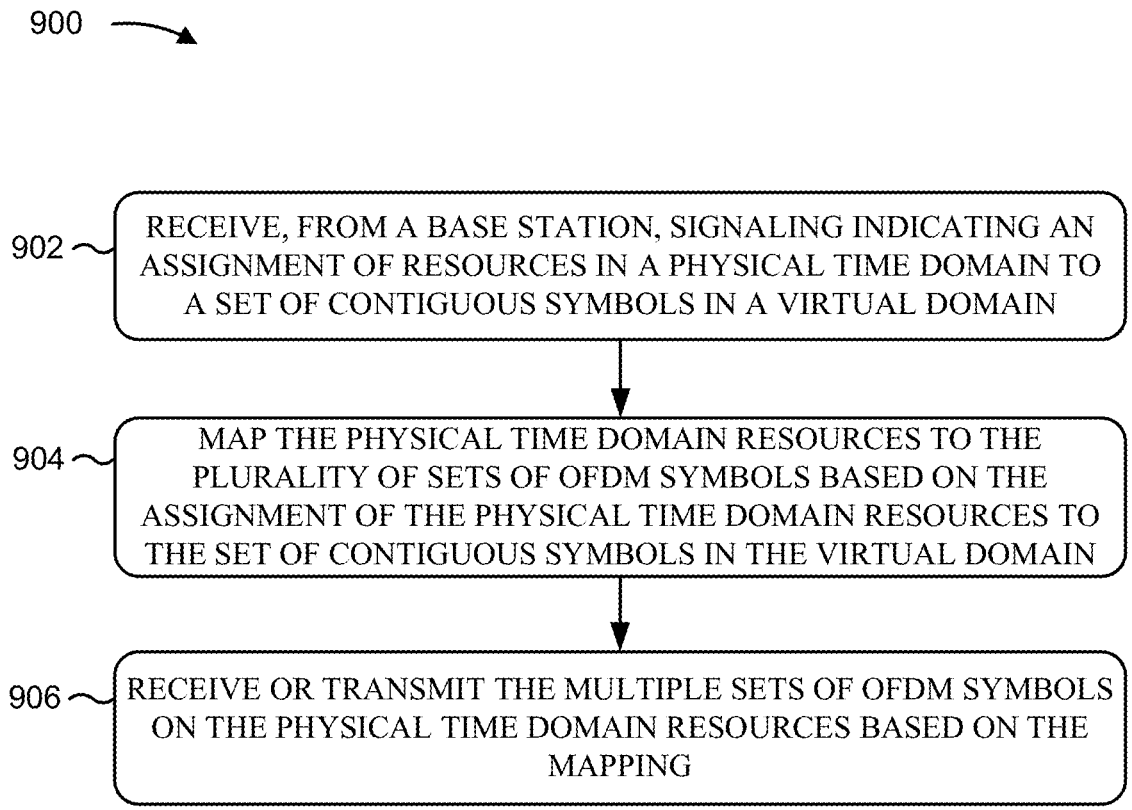
FIG. 9 is a flow diagram illustrating an example process performed, for example, by a UE, for receiving an assignment of communication resources to fragmented symbols, in accordance with various aspects of the present disclosure.

FIG. 9 is a flow diagram illustrating an example process 900 performed, for example by a UE that supports assignment for fragmented resources, in accordance with various aspects of the present disclosure. The example process 900 is an example of receiving an assignment for fragmented OFDM symbols for physical channel transmissions, in accordance with various aspects of the present disclosure. The physical channel transmissions may be downlink transmissions or uplink transmissions. The operations of the process 900 may be implemented by a UE, such as a UE 120, or its components, described with reference to FIG. 1. For example, operations of the process 900 may be performed by one or more of the communications manager 705, the transmitter, 720 the receiver 710, the assignment component 730, or the mapping component 750, as described with reference to FIG. 7. In some examples, a UE may execute a set of instructions to control the functional elements of the UE to perform the operations or functions described below. Additionally, or alternatively, a UE may perform aspects of the operations or functions described below using special-purpose hardware.

As shown in FIG. 9, the process 900 begins at block 902, by receiving, from a base station, signaling indicating an assignment of resources in a physical time domain to a set of contiguous symbols in a virtual domain. Each symbol of the set of contiguous symbols in the virtual domain may be associated with a respective OFDM symbol of a respective one of multiple sets of one or more contiguous OFDM symbols in the physical time domain. Each set of OFDM symbols may be an example of an OFDM symbol fragment. Additionally, each set of OFDM symbols may be associated with a respective slot of multiple slots in the physical time domain. Furthermore, the multiple sets of OFDM symbols may carry a single physical channel payload. At block 904, the process maps the physical time domain resources to the number of sets of OFDM symbols based on the assignment of the physical time domain resources to the set of contiguous symbols in the virtual domain. At block 906, the process receives or transmits the multiple sets of OFDM symbols on the physical time domain resources based on the mapping.

Figure 10:
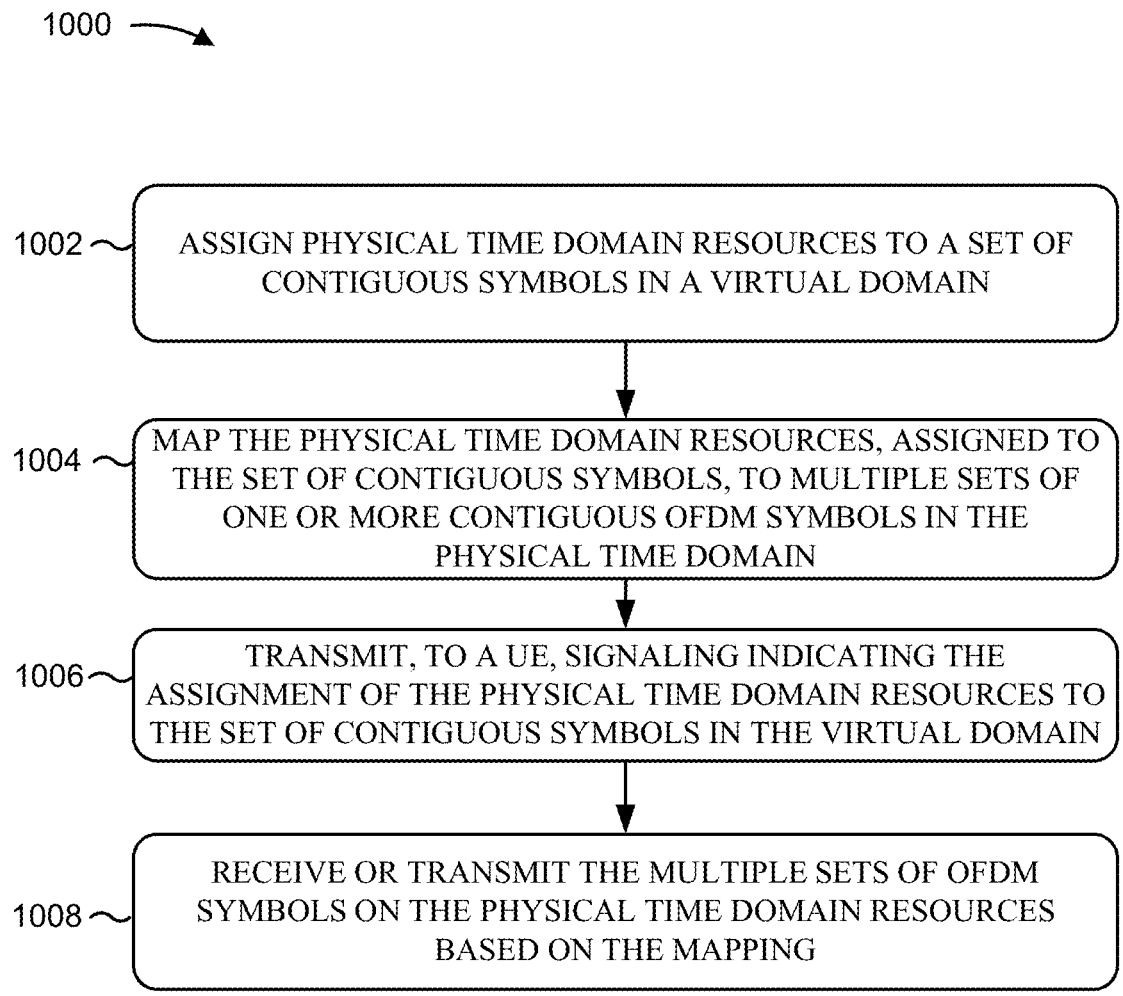
FIG. 10 is a flow diagram illustrating an example process performed, for example, by a base station, for assigning communication resources to fragmented symbols, in accordance with various aspects of the present disclosure.

FIG. 10 is a flow diagram illustrating an example process 1000 performed, for example, by a base station that supports assignment for fragmented resources, in accordance with various aspects of the present disclosure. The example process 1000 is an example of assigning fragmented uplink OFDM symbols for physical channel transmissions. The physical channel transmissions may be downlink transmissions or uplink transmissions. The operations of the process 1000 may be implemented by a base station, such as a base station 110, or its components, described with reference to FIG. 1. For example, operations of the process 1000 may be performed by one or more of the communications manager 805, the transmitter, 820 the receiver 810, the assigning component, or the mapping component 860, as described with reference to FIG. 8. In some examples, a UE may execute a set of instructions to control the functional elements of the UE to perform the operations or functions described below. Additionally, or alternatively, a UE may perform aspects of the operations or functions described below using special-purpose hardware.

As shown in FIG. 10, the process 1000 may be in block 1002 by assigning physical time domain resources to a set of contiguous symbols in a virtual domain. At block 1004, the process maps the physical time domain resources, assigned to the set of contiguous symbols, to multiple sets of one or more contiguous OFDM symbols in the physical time domain. Each set of OFDM symbols may be associated with a respective slot of multiple slots in the physical time domain. The multiple sets of OFDM symbols may carry a single physical channel payload. Each set of OFDM symbols may be an example of an OFDM symbol fragment. At block 1006, the process transmits, to a UE, signaling indicating the assignment of the physical time domain resources to the set of contiguous symbols in the virtual domain. Each symbol of the set of contiguous symbols may be associated with a respective OFDM symbol of a respective one of the multiple sets of one or more contiguous OFDM symbols. At block 1008, the process receives or transmits the multiple sets of OFDM symbols on the physical time domain resources based on the mapping.

The following provides an overview of some Aspects of the present disclosure:

Aspect 1. A method of wireless communication by a UE, comprising: receiving, from a base station, signaling indicating an assignment of resources in a physical time domain to a set of contiguous symbols in a virtual domain, each symbol of the set of contiguous symbols in the virtual domain being associated with a respective OFDM symbol of a respective one of a plurality of sets of one or more contiguous OFDM symbols in the physical time domain, each set of OFDM symbols being associated with a respective slot of a plurality of slots in the physical time domain, the plurality of sets of OFDM symbols carrying a single physical channel payload; mapping the physical time domain resources to the plurality of sets of OFDM symbols based on the assignment of the physical time domain resources to the set of contiguous symbols in the virtual domain; and receiving or transmitting the plurality of sets of OFDM symbols on the physical time domain resources based on the mapping.

Aspect 2. The method of Aspect 1, wherein: the UE transmits the plurality of sets of OFDM symbols; and the method further comprises concatenating the plurality of sets of OFDM symbols into the set of contiguous symbols in the virtual domain.

Aspect 3. The method of any one of Aspects 1-2, wherein: each OFDM symbol associated with each set of OFDM symbols of the plurality of sets of OFDM symbols includes a DMRS; and the respective DMRSs having a same DMRS pattern.

Aspect 4. The method of Aspect 3, wherein: the UE transmits the plurality of sets of OFDM symbols; and the method further comprises: frequency-division multiplexing, for each set of OFDM symbols of the plurality of sets of OFDM symbols, the respective DMRS with data or control information; and transmitting the respective frequency-division-multiplexed DMRS and the data or the control information as an OFDM waveform.

Aspect 5. The method of Aspect 3, wherein: the UE transmits the plurality of sets of OFDM symbols; and the method further comprises: time-division multiplexing, for each set of ODFM symbols of the plurality of sets of OFDM symbols, the respective DMRS with data or control information; applying a transform precoding operation to the time-division multiplexed DMRS and the data or the control information, the transform precoding operation comprises a DFT operation; and transmitting the respective frequencydivision-multiplexed DMRS and the data or the control information as a DFT-S-OFDM waveform.

Aspect 6. The method of any one of Aspects 1-5, wherein: the plurality of sets of OFDM symbols comprise a first set of OFDM symbols and a second set of OFDM symbols; and the first set of OFDM symbols being separated from the second set of fragmented OFDM symbols by a slot boundary.

Aspect 7. The method of any one of Aspects 1-5, wherein: the UE transmits the plurality of sets of OFDM symbols; and the plurality of sets of OFDM symbols comprise a first set of OFDM symbols and a second set of OFDM symbols, the first set of OFDM symbols being separated from the second set of OFDM symbols by one or more downlink symbols or one or more flexible symbols.

Aspect 8. The method of any one of Aspects 1-5, wherein: the UE receives the plurality of sets of OFDM symbols; and the plurality of sets of OFDM symbols comprise a first set of OFDM symbols and a second set of OFDM symbols, the first set of OFDM symbols being separated from the second set of OFDM symbols by one or more uplink symbols or one or more flexible symbols.

Aspect 9. A method of wireless communication by a base station, comprising: assigning physical time domain resources to a set of contiguous symbols in a virtual domain; mapping the physical time domain resources, assigned to the set of contiguous symbols, to a plurality of sets of one or more contiguous OFDM symbols in the physical time domain, each set of OFDM symbols being associated with a respective slot of a plurality of slots in the physical time domain, the plurality of sets of OFDM symbols carrying a single physical channel payload; transmitting, to a UE, signaling indicating the assignment of the physical time domain resources to the set of contiguous symbols in the virtual domain, each symbol of the set of contiguous symbols associated with a respective OFDM symbol of a respective one of the plurality of sets of one or more contiguous OFDM symbols; and receiving or transmitting the plurality of sets of OFDM symbols on the physical time domain resources based on the mapping.

Aspect 10. The method of Aspect 9, wherein: each OFDM symbol associated with each set of OFDM symbols of the plurality of sets of OFDM symbols includes a DMRS; and the respective DMRSs having a same DMRS pattern.

Aspect 11. The method of any one of Aspects 9-10, wherein: the plurality of sets of OFDM symbols comprise a first set of OFDM symbols and a second set of OFDM symbols; and the first set of OFDM symbols being separated from the second set of OFDM symbols by a slot boundary.

Aspect 12. The method of any one of Aspects 9-10, wherein: the base station transmits the plurality of sets of OFDM symbols; and the plurality of sets of OFDM symbols comprise a first set of OFDM symbols and a second set of OFDM symbols, the first set of OFDM symbols being separated from the second set of OFDM symbols by one or more uplink symbols or one or more flexible symbols.

Aspect 13. The method of any one of Aspects 9-10, wherein: the base station receives the plurality of sets of OFDM symbols; and the plurality of sets of OFDM symbols comprise a first set of OFDM symbols and a second set of OFDM symbols, the first set of OFDM symbols being separated from the second set of OFDM symbols by one or more downlink symbols or one or more flexible symbols.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, or a combination of hardware and software. As used, a processor is implemented in hardware, firmware, or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, or the like.

It will be apparent that systems or methods described may be implemented in different forms of hardware, firmware, or a combination of hardware and software. The actual specialized control hardware or software code used to implement these systems or methods is not limiting of the aspects. Thus, the operation and behavior of the systems or methods were described without reference to specific software code—it being understood that software and hardware can be designed to implement the systems or methods based, at least in part, on the description.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (for example, related items, unrelated items, a combination of related and unrelated items, or the like), and may be used interchangeably with "one or more." Where only one item is intended, the phrase "only one" or similar language is used. Also, as used, the terms "has," "have," "having," or the like are intended to be open-ended terms. Further, the phrase "based on" is intended to mean "based, at least in part, on" unless explicitly stated otherwise.

As used, "or" is used intended to be interpreted in the inclusive sense, unless otherwise explicitly indicated. For example, "a or b" may include a only, b only, or a combination of a and b. As used, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

What is claimed is:

1. A method of wireless communication by a user equipment (UE), comprising:

receiving, from a base station, signaling indicating an assignment of a plurality of sets of orthogonal frequency-division multiplexed (OFDM) symbols associated with a physical time domain symbol pattern to a set of contiguous virtual domain symbols in a virtual domain,
  two or more sets of OFDM symbols of the plurality of sets of OFDM symbols being non-contiguous, with respect to each other, in the physical time domain symbol pattern, the plurality of sets of OFDM symbols having a same symbol type, the symbol type being an uplink symbol type or a downlink symbol type,
  the physical time domain pattern including a set of contiguous physical time domain symbols across a plurality of slots, the set of contiguous physical time domain symbols including one or more uplink symbols and one or more downlink symbols,
  each virtual domain symbol of the set of contiguous virtual domain symbols being assigned a respective OFDM symbol of a respective one of the plurality of sets of OFDM symbols,
  each set of OFDM symbols being associated with a respective subset of contiguous physical time domain symbols, of the set of contiguous physical time domain symbols, within a slot of the plurality of slots in the physical time domain, the plurality of sets of OFDM symbols carrying a single physical channel payload; and
receiving or transmitting the plurality of sets of OFDM symbols on physical time domain resources based on mapping the physical time domain resources, from the physical time domain symbol pattern, to the set of contiguous virtual domain symbols in accordance with the assignment of the plurality of sets of OFDM symbols to the set of contiguous virtual domain symbols.

2. The method of claim 1, wherein:
the UE transmits the plurality of sets of OFDM symbols; and
the method further comprises concatenating the plurality of sets of OFDM symbols into the set of contiguous virtual domain symbols.

3. The method of claim 1, wherein:
each OFDM symbol associated with each set of OFDM symbols of the plurality of sets of OFDM symbols includes a demodulation reference signal (DMRS); and
the respective DMRSs have a same DMRS pattern.

4. The method of claim 3, wherein:
the UE transmits the plurality of sets of OFDM symbols; and
the method further comprises:
  frequency-division multiplexing, for each set of OFDM symbols of the plurality of sets of OFDM symbols, the respective DMRS with data or control information; and
  transmitting the respective frequency-division-multiplexed DMRS and the data or the control information as an OFDM waveform.

5. The method of claim 3, wherein:
the UE transmits the plurality of sets of OFDM symbols; and
the method further comprises:
  time-division multiplexing, for each set of ODFM symbols of the plurality of sets of OFDM symbols, the respective DMRS with data or control information;
  applying a transform precoding operation to the time-division multiplexed DMRS and the data or the control information, the transform precoding operation comprises a DFT operation; and
  transmitting the respective frequency-division-multiplexed DMRS and the data or the control information as a discrete Fourier transform spread OFDM (DFT-S-OFDM) waveform.

6. The method of claim 1, wherein:
the two or more sets of OFDM symbols include a first set of OFDM symbols and a second set of OFDM symbols; and
the first set of OFDM symbols are separated from the second set of OFDM symbols by a slot boundary.

7. The method of claim 1, wherein:
the UE transmits the plurality of sets of OFDM symbols; and
the two or more sets of OFDM symbols include a first set of OFDM symbols and a second set of OFDM symbols, the first set of OFDM symbols being separated from the second set of OFDM symbols by one or more downlink symbols and/or one or more flexible symbols.

8. The method of claim 1, wherein:
the UE receives the plurality of sets of OFDM symbols; and
the two or more sets of OFDM symbols include a first set of OFDM symbols and a second set of OFDM symbols, the first set of OFDM symbols being separated from the second set of OFDM symbols by one or more uplink symbols and/or one or more flexible symbols.

9. A user equipment (UE) for wireless communications, comprising:
one or more processors;
one or more memories coupled with the one or more processors; and
instructions stored in the one or more memories and operable, when executed by the one or more processors, to cause the UE to:
  receive, from a base station, signaling indicating an assignment of a plurality of sets of orthogonal frequency-division multiplexed (OFDM) symbols associated with a physical time domain symbol pattern to a set of contiguous virtual domain symbols in a virtual domain,
  two or more sets of OFDM symbols of the plurality of sets of OFDM symbols being non-contiguous, with respect to each other, in the physical time domain symbol pattern, the plurality of sets of OFDM symbols having a same symbol type, the symbol type being an uplink symbol type or a downlink symbol type,
  the physical time domain pattern including a set of contiguous physical time domain symbols across a plurality of slots, the set of contiguous physical time domain symbols including one or more uplink symbols and one or more downlink symbols,
  each virtual domain symbol of the set of contiguous virtual domain symbols being assigned a respective OFDM symbol of a respective one of the plurality of sets of OFDM symbols,
  each set of OFDM symbols being associated with a respective subset of contiguous physical time domain symbols, of the set of contiguous physical time domain symbols, within a slot of the plurality of slots in the physical time domain, the plurality of sets of OFDM symbols carrying a single physical channel payload; and receive or transmit the plurality of sets of OFDM symbols on physical time domain resources based on mapping the physical time domain resources, from the physical time domain symbol pattern, to the set of contiguous virtual domain symbols in accordance with the assignment of the plurality of sets of OFDM symbols to the set of contiguous virtual domain symbols.

10. The UE of claim 9, wherein:
the UE transmits the plurality of sets of OFDM symbols; and
execution of the instructions further cause the apparatus to concatenate the plurality of sets of OFDM symbols into the set of contiguous virtual domain symbols.

11. The UE of claim 9, wherein:
each OFDM symbol associated with each set of OFDM symbols of the plurality of sets of OFDM symbols includes a demodulation reference signal (DMRS); and
the respective DMRSs have a same DMRS pattern.

12. The UE of claim 11, wherein:
the UE transmits the plurality of sets of OFDM symbols; and
execution of the instructions further cause the apparatus to:
frequency-division multiplex, for each set of OFDM symbols of the plurality of sets of OFDM symbols, the respective DMRS with data or control information; and
transmitting the respective frequency-division-multiplexed DMRS and the data or the control information as an OFDM waveform.

13. The UE of claim 11, wherein:
the UE transmits the plurality of sets of OFDM symbols; and
execution of the instructions further cause the UE to:
time-division multiplex, for each set of ODFM symbols of the plurality of sets of OFDM symbols, the respective DMRS with data or control information;
apply a transform precoding operation to the time-division multiplexed DMRS and the data or the control information, the transform precoding operation comprises a DFT operation; and
transmit the respective frequency-division-multiplexed DMRS and the data or the control information as a discrete Fourier transform spread OFDM (DFT-S-OFDM) waveform.

14. The UE of claim 9, wherein:
the two or more sets of OFDM symbols include a first set of OFDM symbols and a second set of OFDM symbols; and
the first set of OFDM symbols is separated from the second set of OFDM symbols by a slot boundary.

15. The UE of claim 9, wherein:
the UE transmits the plurality of sets of OFDM symbols; and
the two or more sets of OFDM symbols include a first set of OFDM symbols and a second set of OFDM symbols, the first set of OFDM symbols being separated from the second set of OFDM symbols by one or more downlink symbols and/or one or more flexible symbols.

16. The UE of claim 9, wherein:
the UE receives the plurality of sets of OFDM symbols; and
the two or more sets of OFDM symbols include a first set of OFDM symbols and a second set of OFDM symbols, the first set of OFDM symbols being separated from the second set of OFDM symbols by one or more uplink symbols and/or one or more flexible symbols.

17. A method of wireless communication by a base station, comprising:
assigning a plurality of sets of orthogonal frequency-division multiplexed (OFDM) symbols associated with a physical time domain symbol pattern to a set of contiguous virtual domain symbols in a virtual domain,
two or more sets of OFDM symbols of the plurality of sets of OFDM symbols being non-contiguous, with respect to each other, in the physical time domain symbol pattern, the plurality of sets of OFDM symbols having a same symbol type, the symbol type being an uplink symbol type or a downlink symbol type,
the physical time domain pattern including a set of contiguous physical time domain symbols across a plurality of slots, the set of contiguous physical time domain symbols including one or more uplink symbols and one or more downlink symbols;
mapping physical time domain resources to the set of contiguous virtual domain symbols in accordance with assigning the plurality of sets of OFDM symbols to the set of contiguous virtual domain symbols, the plurality of sets of OFDM symbols carrying a single physical channel payload;
transmitting, to a user equipment (UE), signaling indicating the assignment of the physical time domain resources to the set of contiguous virtual domain symbols, each symbol of the set of contiguous virtual domain symbols associated with a respective OFDM symbol of a respective one of the plurality of sets of one or more contiguous OFDM symbols; and
receiving or transmitting the plurality of sets of OFDM symbols on the physical time domain resources in accordance with the mapping.

18. The method of claim 17, wherein:
each OFDM symbol associated with each set of OFDM symbols of the plurality of sets of OFDM symbols includes a demodulation reference signal (DMRS); and
the respective DMRSs have a same DMRS pattern.

19. The method of claim 17, wherein:
the two or more sets of OFDM symbols include a first set of OFDM symbols and a second set of OFDM symbols; and
the first set of OFDM symbols is separated from the second set of OFDM symbols by a slot boundary.

20. The method of claim 17, wherein:
the base station transmits the plurality of sets of OFDM symbols; and
the two or more sets of OFDM symbols include a first set of OFDM symbols and a second set of OFDM symbols, the first set of OFDM symbols being separated from the second set of OFDM symbols by one or more uplink symbols and/or one or more flexible symbols.

21. The method of claim 17, wherein:
the base station receives the plurality of sets of OFDM symbols; and
the two or more sets of OFDM symbols include a first set of OFDM symbols and a second set of OFDM symbols, the first set of OFDM symbols being separated from the second set of OFDM symbols by one or more downlink symbols and/or one or more flexible symbols.

22. A network node for wireless communications, comprising:
one or more processors;

one or more memories coupled with the one or more processors; and instructions stored in the one or more memories and operable, when executed by the one or more processors, to cause the network node to:
- assign a plurality of sets of orthogonal frequency-division multiplexed (OFDM) symbols associated with a physical time domain symbol pattern to a set of contiguous virtual domain symbols in a virtual domain,
  - two or more sets of OFDM symbols of the plurality of sets of OFDM symbols being non-contiguous, with respect to each other, in the physical time domain symbol pattern, the plurality of sets of OFDM symbols having a same symbol type, the symbol type being an uplink symbol type or a downlink symbol type,
  - the physical time domain pattern including a set of contiguous physical time domain symbols across a plurality of slots, the set of contiguous physical time domain symbols including one or more uplink symbols and one or more downlink symbols;
- map physical time domain resources to the set of contiguous virtual domain symbols in accordance with assigning the plurality of sets of OFDM symbols to the set of contiguous virtual domain symbols, the plurality of sets of OFDM symbols carrying a single physical channel payload;
- transmit, to a user equipment (UE), signaling indicating the assignment of the physical time domain resources to the set of contiguous virtual domain symbols, each symbol of the set of contiguous virtual domain symbols associated with a respective OFDM symbol of a respective one of the plurality of sets of one or more contiguous OFDM symbols; and
- receive or transmit the plurality of sets of OFDM symbols on the physical time domain resources in accordance with the mapping.

23. The network node of claim 22, wherein:

each OFDM symbol associated with each set of OFDM symbols of the plurality of sets of OFDM symbols includes a demodulation reference signal (DMRS); and the respective DMRSs have a same DMRS pattern.

24. The network node of claim 22, wherein:

the two or more sets of OFDM symbols include a first set of OFDM symbols and a second set of OFDM symbols; and the first set of OFDM symbols is separated from the second set of OFDM symbols by a slot boundary.

25. The network node of claim 22, wherein:

the apparatus transmits the plurality of sets of OFDM symbols; and the two or more sets of OFDM symbols include a first set of OFDM symbols and a second set of OFDM symbols, the first set of OFDM symbols being separated from the second set of OFDM symbols by one or more uplink symbols and/or one or more flexible symbols.

26. The network node of claim 22, wherein:

the apparatus receives the plurality of sets of OFDM symbols; and the two or more sets of OFDM symbols include a first set of OFDM symbols and a second set of OFDM symbols, the first set of OFDM symbols being separated from the second set of OFDM symbols by one or more downlink symbols and/or one or more flexible symbols.

* * * * *